J. P. GERAGHTY & G. W. NAYLOR.
CAR FENDER.
APPLICATION FILED APR. 25, 1910.
988,999.
Patented Apr. 11, 1911.
2 SHEETS—SHEET 2.
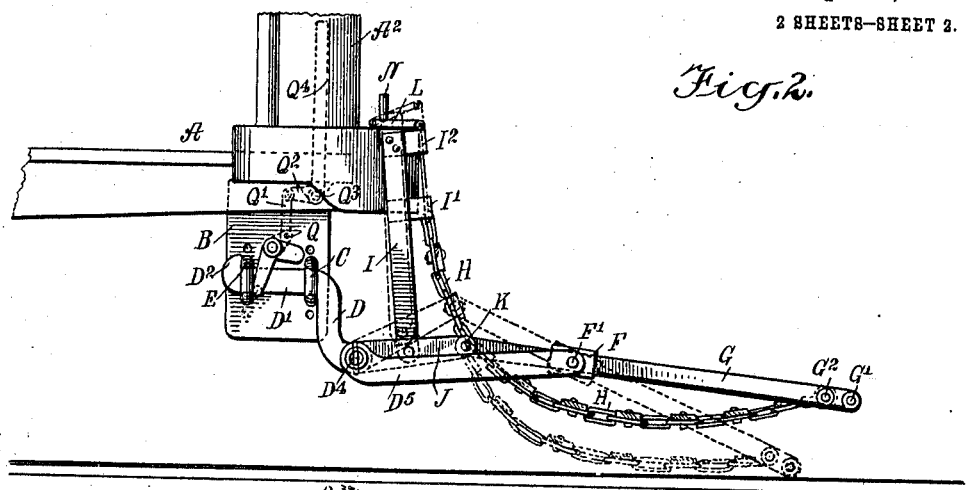
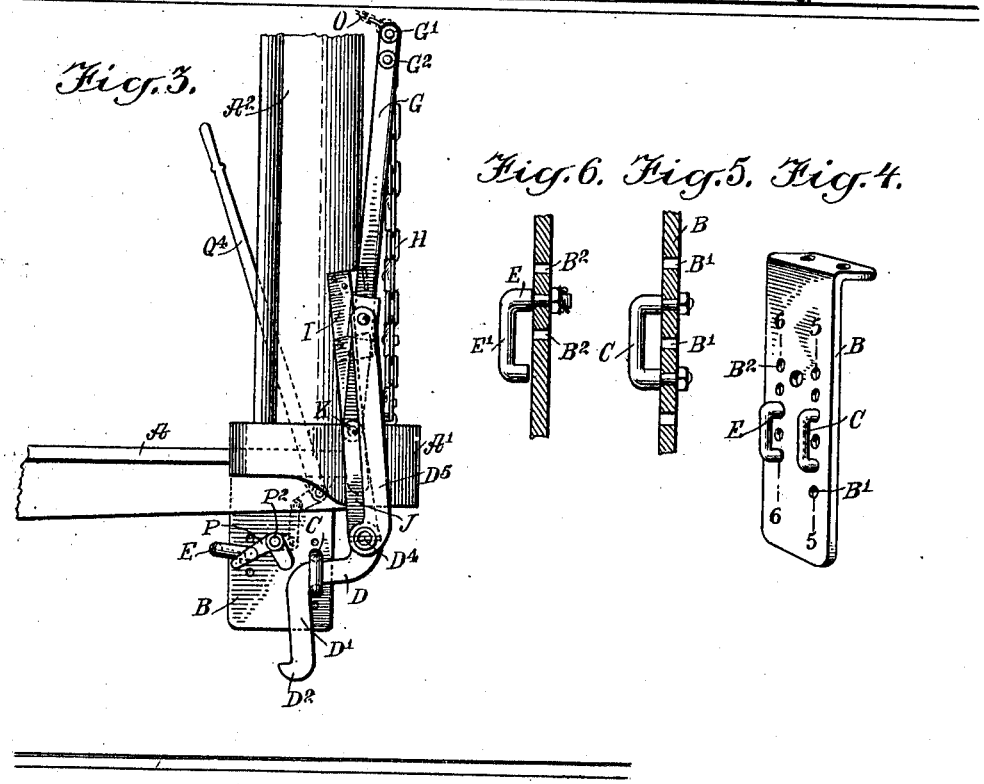
WITNESSES:
INVENTORS
John P. Geraghty
George W. Naylor
BY
ATTORNEYS

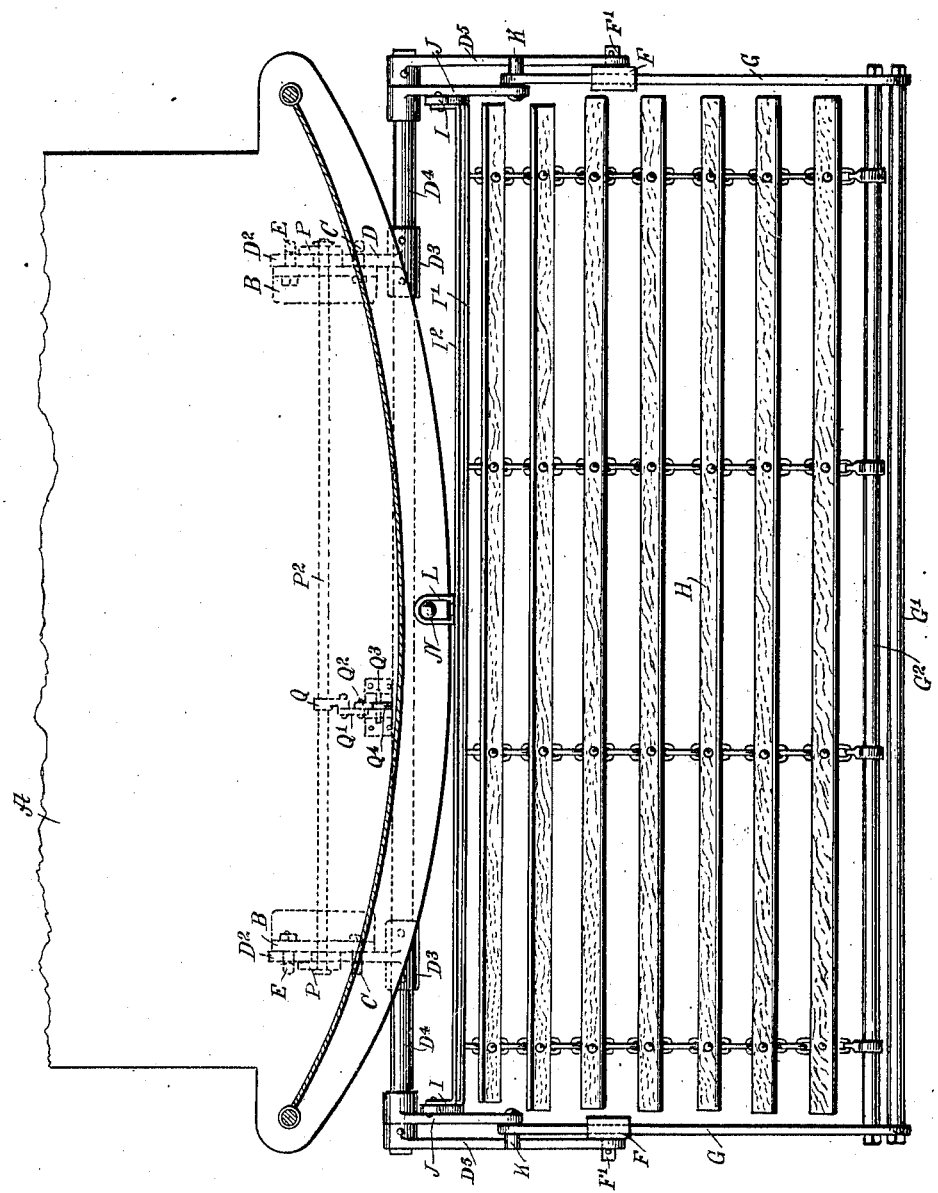

UNITED STATES PATENT OFFICE.

JOHN P. GERAGHTY AND GEORGE W. NAYLOR, OF JERSEY CITY, NEW JERSEY, ASSIGNORS OF FORTY-FIVE ONE-HUNDREDTHS TO EDWARD C. CURRY AND CHARLES A. STONEHAM, BOTH OF NEW YORK, N. Y.

CAR-FENDER.

988,999.  Specification of Letters Patent.  Patented Apr. 11, 1911.

Application filed April 25, 1910. Serial No. 557,388.

*To all whom it may concern:*

Be it known that we, JOHN P. GERAGHTY and GEORGE W. NAYLOR, citizens of the United States, and residents of Jersey City, in the county of Hudson and State of New Jersey, have invented a new and Improved Car-Fender, of which the following is a full, clear, and exact description.

The object of the invention is to provide a new and improved car fender, more especially designed for use on cars of street railways and the like, and arranged to normally stand a distance above the track, so as not to interfere with switches and the like or become injured by contact with the track, and to automatically move into a lowermost position when striking a person or other object in its path and safely receive and retain the object, thus preventing injury to the same.

A further object of the invention is to permit of conveniently and quickly placing the fender in position on either end of the car or removing it therefrom, and folding the fender up on the end of the car in such a manner that the car bumper projects beyond the fender and hence, in the case of a collision, protects the fender. For the purpose mentioned, use is made of a support for attachment to the car, and which carries an apron frame mounted to turn and to slide on the said support, the apron frame being connected by links with the said support, to cause the apron frame to swing downward at its front end when the latter strikes an obstruction in its path.

A practical embodiment of the invention is represented in the accompanying drawings forming a part of this specification, in which similar characters of reference indicate corresponding parts in all the views.

Figure 1 is a plan view of the car fender as applied to a car, the dashboard of which is shown in section; Fig. 2 is a side elevation of the fender; Fig. 3 is a similar view of the same, and showing the car fender folded up against the end of the car; Fig. 4 is a perspective view of one of the hangers; Fig. 5 is an enlarged cross section of the same on the line 5—5 of Fig. 4; Fig. 6 is a similar view of the same on the line 6—6 of Fig. 4; and Fig. 7 is a perspective view of the crank arm for unlocking the support and imparting an initial swinging movement to the same.

On the under side of the platform A of the car are secured hangers B, provided with bearings C engaged by the angular arms D of a support, having the arms D' adapted to rest or abut against the under side of stops E pivoted on the hangers B. The terminals of the arms D' are in the form of hooks $D^2$ abutting against the stops E, so as to hold the support against longitudinal movement when the car fender is in use, as shown in Figs. 1 and 2. The angular arms D are connected with each other by a cross rod $D^4$, provided at its ends with forwardly-extending side arms $D^5$, in which are mounted to turn the pivots F' of guideways F, in which are mounted to slide the side arms G of a main apron frame, having the front cross bars G', $G^2$ connecting the side arms G with each other. The apron H, of any approved construction, preferably in the form of a slat belt, as indicated in the drawings, is connected at its forward end with the cross bar $G^2$, while the rear end of the said apron H is attached to a cross bar I' secured to the side arms I of an upright frame, pivoted at the lower ends of said arms I to links J, pivotally connected by pivots K with the rear ends of the side arms G of the apron frame. The rear ends of the links J are fulcrumed on the cross bar $D^4$ of the fender support, as plainly indicated in the drawings. The side arms I of the upright frame are connected with each other at their upper ends by a cross bar $I^2$, and the said cross bars I' and $I^2$ are preferably provided with angular ends, as indicated in Figs. 1 and 2, so that the said cross bars $I^2$ and I' may clear the front face of the bumper A' at the end of the platform A, and when the fender is folded, the said cross bars I' and $I^2$ clear the usual dashboard $A^2$ at the end of the car. The upper cross bar $I^2$ is adapted to be connected by a loop L with a coupling pin N at the top of the bumper A', so as to hold the upright frame in the proper position, as plainly shown in Fig. 2.

Now when the several parts are in the normal position indicated in Fig. 2, then the cross bars G', $G^2$ and the forward ends of the side arms G of the apron frame are held at such a distance above the track that the fender may readily clear switches and the like, and upward movement of the forward end of the apron frame is prevented by the pivots K being extended outwardly over the top of the side arms D⁵ of the fender support (see Figs. 1 and 2). Now in case the obstruction on the track is struck by the front cross bar G', then the apron frame slides rearwardly in the guideways F, and as the rear ends of the side arms G of the apron frame are pivotally connected with the link J, it is evident that a downward swinging movement is given to the apron frame, the latter turning with the guideways F pivoted in the side arms D⁵ of the fender support. Thus the apron frame assumes the position shown in dotted lines in Fig. 2, that is, the cross bar G' moves down close to the track and with it the lower front portion of the apron H, so that the obstruction is not liable to pass under the fender but must necessarily fall into the apron H.

From the foregoing, it will be seen that by the arrangement described, the apron frame has a rearward sliding as well as a downward sliding movement when striking an object in its path, so that the object is safely picked up by the fender without danger of injuring the object.

When the car fender is not to be used, it can be readily swung up into the position shown in Fig. 3, by swinging the side arms D of the fender support upward in the bearings C, the said support carrying the apron frame along, and in order to hold the several parts in this raised position a suitable fastening device O is connected with the bar G' and with the top of the dashboard A², as indicated in dotted lines in Fig. 3. Now by constructing the parts in the manner described, the side arms I, the links J and the side arms G readily clear the sides of the bumper A', so that the front end of the bumper projects beyond the folded car fender, and consequently the fender is not liable to be injured in case of a collision between two cars.

In case a large obstruction, such as a box, barrel or the like, is on the track, then it is desirable to raise the apron frame and with it the apron, so as to clear the said obstruction. For this purpose the following device is provided: A stop E, which has an angular arm E', is mounted to swing on each hanger B and is adapted to be engaged by a transverse pin P' on a bell crank lever P, having its shaft P² journaled in suitable bearings in the hangers B. The shaft P² is provided with an arm Q, connected by a link Q' with an arm Q², fulcrumed at Q³ on the platform A, and provided with an upwardly-extending handle Q⁴ under the control of the motorman in charge of the car. The arm P³ of each bell crank lever P, extends over the top of the angular arm D' of the fender support, and when the several parts are in the position shown in Fig. 2 and it is desired to raise the fender, then the motorman swings the handle Q⁴ rearwardly to the position indicated in Fig. 3, whereby the pin P' of the bell crank lever P swings the stop E rearwardly out of engagement with the angular arm D', and at the same time the arm P³ of each bell crank lever P bears down on the angular arm D', so as to swing the fender support upward and with it the apron frame and apron to clear the obstruction from the track. When this has been done, the operator holds the handle Q⁴ in its normal vertical position, whereby the bell crank levers P are returned and allow the fender support to swing back to its normal position. The stops E can then return by their own weight to their normal positions, to again lock the arms D' in place.

The bearings C and the stops E are vertically adjustable on the hangers B, to support the car fender a desired distance above the road bed, and for this purpose the hangers B are provided with vertical rows of apertures B', B², for engagement by the bearings C and the stops E, as will be readily understood by reference to Figs. 4, 5 and 6. When it is desired to remove the fender, it can be quickly done by disconnecting the loop L from the pin N, and swinging the stops E rearwardly into open position, as indicated in Fig. 3, after which the operator can take hold of the fender support and swing the same upward to disengage the hook D² from the stop E, and draw the arm D' and its hook D² out of engagement with the corresponding bearing C.

Having thus described our invention, we claim as new and desire to secure by Letters Patent:

1. A car fender, comprising a support for attachment to the car, an apron frame mounted to turn and to slide on the said support, and links pivoted on the said support and pivotally connected with the rear end of the said apron frame, to cause the apron frame to swing downward at its front end on moving the apron frame rearwardly by an obstruction in the path of the apron frame.

2. A car fender, comprising a support for attachment to the car, an apron frame mounted to turn and to slide on the said support, links pivoted on the said support and pivotally connected with the rear end of the said apron frame to cause the apron frame to swing downward at its front end on moving the apron frame rearwardly by an obstruction in the path of the apron frame, an upright frame pivoted on the said links, and an apron connecting the said upright frame with the front of the said apron frame.

3. A car fender, comprising a support for removable attachment to the end of the car, a main apron frame having side arms, and a front cross bar connecting the said side arms with each other, the said arms being mounted to slide and to turn on the said support, links connecting the said support with the said arms of the said apron frame, at a point in the rear of the sliding and turning connection between the said support and the apron frame, an upright apron frame pivoted on the said links, and an apron attached at its rear end to the said upright apron frame and at its front end to the front cross bar of the main apron frame.

4. A car fender, comprising a support for removable attachment to the end of the car, a main apron frame having side arms and a front cross bar connecting the said side arms with each other, the said arms being mounted to slide and to turn on the said support, links connecting the said support with the said arms of the said apron frame at a point in the rear of the sliding and turning connection between the said support and the apron frame, an upright apron frame pivoted on the said links, an apron attached at its rear end to the said upright apron frame and at its front end to the front cross bar of the main apron frame, and means for attaching the said upright apron frame to the front of the car.

5. A car fender, comprising hangers for attachment to the car, bearings on the said hangers, stops on the said hangers, a support for the fender proper, and having angular arms for engagement with the said bearings, and a manually-controlled device for engagement with the said support to impart a swinging motion to the same.

6. A car fender, comprising hangers for attachment to the car, bearings on the said hangers, stops pivoted on the said hangers, and a support having side arms for supporting the fender proper, a cross rod carrying the said side arms, and angular arms extending rearward from the said cross rod and adapted to engage the said bearings, the said angular arms terminating in hooks for engagement with the said stops.

7. A car fender, comprising hangers for attachment to the car, U-shaped bearings adjustably secured to the said hangers, stops pivoted on the said hangers in the rear of the said bearings, and a support for the fender proper and having angular arms in engagement with the said bearings and terminating in hooks engaging the said pivoted stops.

8. A car fender, comprising hangers for attachment to the car, U-shaped bearings adjustably secured to the said hangers, stops pivoted on the said hangers in the rear of the said bearings, a support for the fender proper and having angular arms in engagement with the said bearings and terminating in hooks engaging the said pivoted stops, and manually controlled connected levers mounted to swing on the hangers and each having two arms, one for engagement with the said stop for swinging the same out of engagement with the said hook, the other arm of each lever being adapted to engage the said angular arm to impart a swinging motion to the said support.

In testimony whereof we have signed our names to this specification in the presence of two subscribing witnesses.

JOHN P. GERAGHTY.
GEORGE W. NAYLOR.

Witnesses:
  THEO. G. HOSTER,
  PHILIP D. ROLLHAUS.

---

Copies of this patent may be obtained for five cents each, by addressing the "Commissioner of Patents, Washington, D. C."